(12) United States Patent
Tsai et al.

(10) Patent No.: US 7,929,773 B2
(45) Date of Patent: Apr. 19, 2011

(54) METHOD FOR RECOGNIZING CHARACTERS

(75) Inventors: Wen-Hann Tsai, Taipei (TW); Sheng-Ann Fann, Taipei (TW)

(73) Assignee: Compal Electronics, Inc., Taipei (TW)

( * ) Notice: Subject to any disclaimer, the term of this patent is extended or adjusted under 35 U.S.C. 154(b) by 965 days.

(21) Appl. No.: 11/768,917

(22) Filed: Jun. 27, 2007

(65) Prior Publication Data

US 2008/0137955 A1 Jun. 12, 2008

(30) Foreign Application Priority Data

Dec. 6, 2006 (TW) ................................. 95145348 A

(51) Int. Cl.
*G06K 9/00* (2006.01)
*G06K 9/46* (2006.01)
*G06K 9/48* (2006.01)
*G06K 9/66* (2006.01)

(52) U.S. Cl. ......... 382/190; 382/181; 382/195; 382/200
(58) Field of Classification Search .................. None
See application file for complete search history.

(56) References Cited

U.S. PATENT DOCUMENTS

| | | | | | |
|---|---|---|---|---|---|
| 4,085,401 | A | * | 4/1978 | Chehikian et al. | 382/216 |
| 4,998,285 | A | * | 3/1991 | Suzuki et al. | 382/171 |
| 5,438,630 | A | * | 8/1995 | Chen et al. | 382/159 |
| 5,706,364 | A | * | 1/1998 | Kopec et al. | 382/159 |
| 5,943,443 | A | * | 8/1999 | Itonori et al. | 382/225 |
| 5,963,966 | A | * | 10/1999 | Mitchell et al. | 715/236 |
| 6,400,845 | B1 | * | 6/2002 | Volino | 382/176 |
| 6,707,466 | B1 | * | 3/2004 | Van Sickle et al. | 345/641 |
| 6,848,080 | B1 | | 1/2005 | Lee et al. | |
| 7,302,098 | B2 | * | 11/2007 | Tang et al. | 382/177 |
| 7,362,901 | B2 | * | 4/2008 | Walch | 382/199 |
| 2003/0063317 | A1 | * | 4/2003 | McCully | 358/1.18 |

OTHER PUBLICATIONS

Kahan, Simon; Pavlidis, Theo; Baird, Henry S.; "On the Recognition of Printed Characters of Any Font and Size", IEEE Transactions on Pattern Analysis and Machine Intelligence, vol. PAMI-9 , Issue: 2, 1987 , pp. 274-288.*
Min-Chul Jung; Yong-Chul Shin; Srihari, S.N.; "Multifont classification using typographical attributes", Proceedings of the Fifth International Conference on Document Analysis and Recognition, 1999. ICDAR '99. pp. 353-356.*
Zramdini, A.; Ingold, R.; "Optical font recognition using typographical features", IEEE Transactions on Pattern Analysis and Machine Intelligence, vol. 20 , Issue: 8, 1998 , pp. 877-882.*
Yi Lu "Machine printed character segmentation—An overview", Pattern Recognition, vol. 28, Issue 1, Jan. 1995, pp. 67-80.*
"Office Action of Taiwan counterpart application", issued on Oct. 28, 2009, p.1-p.4.

* cited by examiner

*Primary Examiner* — Samir A Ahmed
*Assistant Examiner* — Li Liu
(74) *Attorney, Agent, or Firm* — Jianq Chyun IP Office

(57) ABSTRACT

A method for recognizing characters is provided. All the characters to be recognized are categorized into a plurality of character categories according to the relative positions of the characters in the typographical lines before the characters are recognized. When recognizing the characters, a character is compared with only those characters in the corresponding character category of the character in the character database. Therefore, the range and number of characters to be compared are reduced, and the accuracy and speed for recognizing characters are improved.

11 Claims, 8 Drawing Sheets

| Character category | Contained characters |
|---|---|
| First category (FULL) | ! ( ) - / : ; ? @ |
| Second category (HIGH) | b d f h l k l t ! # % & + / 0 1 2 3 4 5 6 7 8 9 : ; < = > ? @ A B C D E F G H I J K L M N O P Q R S T U V W X Y Z |
| Third category (DEEP) | g p q y + : ; < = > |
| Fourth category (SHORT) | - ~ |
| Fifth category (SUPER) | ~ ' * |
| Sixth category (SUBSCRIPT) | , . _ |
| Seventh category (CENTER) | a c e i m n o r s t u v w x z + - : ; < = > |
| Eighth category (UNKNOWN) | Remaining characters |

METHOD FOR RECOGNIZING CHARACTERS

CROSS-REFERENCE TO RELATED APPLICATION

This application claims the priority benefit of Taiwan application serial no. 95145348, filed Dec. 6, 2006. All disclosure of the Taiwan application is incorporated herein by reference.

BACKGROUND OF THE INVENTION

1. Field of the Invention

The present invention generally relates to a method for recognizing characters, in particular, to a method for recognizing characters by categorizing the characters with typographical lines.

2. Description of Related Art

In this information explosion era, ordinary people frequently have to read vast quantities of books, newspapers or journals. When some valuable sections or important points are found in an article, they are filed by photocopying or cut editing or directly labelled with a pen. However, for a person who works frequently on words, any data in an article that are useful must first be input into a computer by a key-in process before the data can be subsequently edited or filed. Therefore, a lot of time and labor is wasted.

To resolve this problem, optical recognition techniques have been developed so that useful documents can be scanned into graphical files through a common scanner and then characters in the graphical file can be extracted using character recognition software and converted into corresponding digital characters. As a result, the user can quickly obtain an electronic file of the document for editing or processing. At present, the scope of applications of optical recognition techniques is wide-spread. For example, the filing of literary data of a library, the management of internal documents of an enterprise, the recognition of identity cards and receipts and so on can be easily achieved by using the optical recognition technique. Therefore, not only the data can be accurately recognized, a lot of time and labor for comparing and verifying data can also be saved.

Optical character recognition, commonly shortened to OCR, is mainly used for recognizing the characters of an existing paper document. First, the document to be recognized has to be scanned into a graphical file using a flatbed or a palmtop scanner. Due to dirt on the document, blurs of the characters or resolution of the scanner, some noise may exist in the input image and affect the accuracy of subsequent character recognition. Therefore, the OCR software has to perform tilt correction, noise removal, and image edge sharpening of the graphical file of the scanned document first. Next, the OCR software takes action to separate the graph and the words in the processed graphical file so that the words, graphs and tables in the document are all separated and some of the characters without a clear connection are correctly cut or combined. Thereafter, the OCR software performs a document recognition process by comparing a graphical image of the characters with characters in a database. At the same time, an accurate result of the recognition is output after recognizing phrases and related words through a corrective function. The recognized characters can be directly saved in a Word, PDF or pure text format file. As a result, not only the loading of data input can be reduced, but the speed and accuracy of data input can also be increased.

However, some problems still exist in the current OCR software. These problems often lead to errors in character recognition or failure of recognition and cause much inconvenience to the user. For example, the scan document may be inappropriately positioned so that the scanned graphical file is tilted, inverted (horizontally shifted) or ratio distorted (vertically shifted). Alternatively, when the sizes of a character are different but the shapes are the same, large and small character writing are not recognized and punctuation marks, which have a small character shape, are also difficult to be recognized.

SUMMARY OF THE INVENTION

Accordingly, the present invention is directed to a character recognition method, wherein characters are categorized according to the relative positions between the characters and typographical lines, and only the characters in those corresponding character categories in a character database are compared with these characters, thus, the accuracy and speed of character recognition are improved.

The present invention provides a character recognition method. The method includes: a. scanning a line of printing words, wherein this line of printing words contains a plurality of first characters; b. generating a plurality of typographical lines by using these first characters; c. determining the character category of each first character according to a relative position of the first character in the typographical lines; and d. comparing each first character with a plurality of second characters in a database which belong to the corresponding character category of the first character to obtain the second character corresponding to the first character and accordingly to recognize the first character, wherein the database records a plurality of character categories and the second characters in each of the character categories.

According to an embodiment of the present invention, the typographical lines include a top line, an upper line, a base line, and a bottom line, the area between the top line and the upper line is an upper zone, the area between the upper line and the base line is a central zone, and the area between the base line and the bottom line is a downer zone.

According to an embodiment of the present invention, step c. includes: c1. determining whether or not each first character is a small character; c2. performing small character categorization if the first character is a small character; c3. performing non-small character categorization if the first character is not a small character.

According to an embodiment of the present invention, step c1. includes: c1-1. calculating the character height of each first character; c1-2. comparing the character height of each first character with a predetermined height, and categorizing the first character as a small character if the character height thereof is smaller than the predetermined height.

According to an embodiment of the present invention, after step c1-2., the character recognition method further includes: c1-3. respectively capturing a central reference point of each of the remaining first characters; c1-4. obtaining a central line asymptotic to the central reference points through a least square method; c1-5. determining whether or not the lower edge of each first character is located above the central line, and categorizing the first character as a small character if the lower edge thereof is located above the central line; and c1-6. determining whether or not the upper edge of each first character is located below the central line, and categorizing the first character as a small character if the upper edge thereof is located below the central line.

According to an embodiment of the present invention, step c. further includes categorizing the typographical lines into one of a plurality of states according to the number and types of the typographical lines, wherein the states include a first state, a second state, a third state, and a fourth state. The first state denotes that the typographical lines include foregoing top line, upper line, base line, and bottom line. The second state denotes that the typographical lines include foregoing base line, bottom line, and a typographical line combined by the top line and the upper line. The third state denotes that the typographical lines include foregoing top line, upper line, and a typographical line combined by the base line and the bottom line. The fourth state denotes that the typographical lines include a typographical line combined by the top line and the upper line, and a typographical line combined by the base line and the bottom line.

According to an embodiment of the present invention, step d. includes: d1. calculating a first characteristic value of each first character; and d2. comparing the first characteristic value of each first character with a second characteristic value of each second character in the database which belongs to the corresponding character category of the first character to obtain the second character having the closest characteristic value and use it as the recognized character of the first character. In addition, step d. further includes recognizing each first character by using a corresponding prediction model of the first character.

According to the present invention, a mechanism for categorizing and comparing printing words is adopted, wherein the printing words are categorized according to the relative positions thereof to their typographical lines, and meanwhile, each character is compared with only those characters in the corresponding character category of this character in a character database; thus, the scope and number of character comparisons are both reduced, and accordingly the accuracy and speed of character recognition are improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
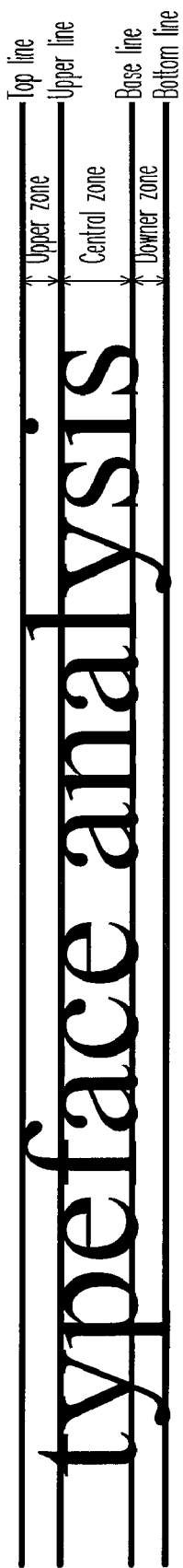
FIG. 1 illustrates some typographical lines according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Wile writing English characters, the sizes and positions of these characters are usually adjusted or arranged along a particular track according to the characteristics of the character types. These hidden "reference lines" are similar to those four straight lines printed in a textbook for one to practice these characters, and one can write clear and tidy characters along these straight lines. Similarly, the English characters are printed along these reference lines as well, and these reference lines are referred to typographical lines in the present disclosure.

FIG. 1 illustrates some typographical lines according to an embodiment of the present invention. Referring to FIG. 1, in the present embodiment, four typographical lines are defined based on the type of each character in the line of printing words "typeface analysis". These typographical lines are respectively referred to a top line, an upper line, a base line, and a bottom line according to the relative locations thereof, and the areas between these typographical lines are respectively referred to an upper zone, a central zone, and a lower zone. It should be noted that in FIG. 1, each printed character may be considered being formed by a plurality of connect-components (CC), and these CCs are referred to a CC group.

As described above, according to the characteristic of English language, all English characters fall within the four typographical lines when they are printed, and characters of different characteristics (for example, small letters, capital letters, superscript characters, subscript characters) take different zones between these typographical lines. Accordingly, in the present invention, all the characters in a character database are categorized into different character categories, and while recognizing characters, the corresponding character category of a character is located first and then the character is compared with all the characters in the corresponding character category in the character database so as to obtain an accurate recognized character. Embodiments of the present invention will be described below with reference to accompanying drawings.

Figures 2, 3:
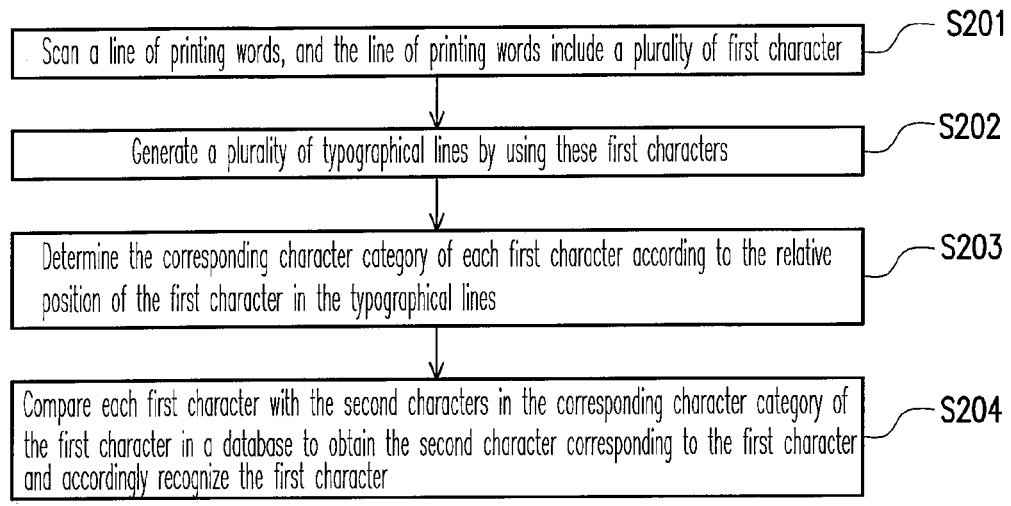
FIG. 2 is a flowchart illustrating a character recognition method according to an embodiment of the present invention.
FIG. 3 illustrates character categories according to an embodiment of the present invention.

FIG. 2 is a flowchart illustrating a character recognition method according to an embodiment of the present invention. Referring to FIG. 2, in the present embodiment, a line of printing words is recognized by comparing each character in this line with the characters in a particular character category in a database.

First, this line of printing words is scanned, wherein this line of printing words include a plurality of first characters (step S201). Here the line of printing words may be any line of characters captured from a document, and the scope thereof is not limited by the present invention. The recognition process of a single line of printing words will be described demonstratively below.

Next, a plurality of typographical lines is generated by using these first characters (step S202), wherein the generated typographical lines include, as illustrated in FIG. 1, a top line, an upper line, a base line, and a bottom line, and the areas between these typographical lines are respectively an upper zone, a central zone, and a downer zone. However, different number of typographical lines (for example, two or four) may be generated along with different type of characters.

Thereafter, the corresponding character category of each first character is determined according to the relative position of the first character in the typographical lines (step S203). FIG. 3 illustrates character categories according to an embodiment of the present invention. Referring to FIG. 3, in the present embodiment, English characters in a database are categorized into eight categories according to the relative locations thereof in the typographical lines, wherein the first category (FULL) takes the upper zone, the central zone, and the downer zone, the second category (HIGH) takes the upper zone and the central zone, the third category (DEEP) takes the downer zone, the fourth category (SHORT) takes the central zone, the fifth category (SUPER) is the small character and is located around the central line, the sixth category (SUBSCRIPT) takes the area between the central line and the upper line, the seventh category (CENTER) takes the area between the central line and the base line, and the eighth category (UNKNOWN) contains those characters which cannot be categorized according to the relative positions thereof in the typographical lines. However, English characters may also be categorized differently in another embodiment of the present invention, which is not restricted by the present invention.

After the character category of each first character is determined, each first character is compared with a plurality of second characters in the corresponding character category of the first character in a database in order to obtain the second character corresponding to the first character and accordingly recognize the first character (step S204). For example, if a character "N" is to be recognized, the character "N" is categorized to the second category as shown in FIG. 3. While recognizing the characters, only the characters in the second category are compared one by one to the character "N". Accordingly, the number of characters to be compared is greatly reduced, and meanwhile, since characters in the same character category have the same or similar relative positions in the typographical lines, recognition error is avoided and accordingly the accuracy of character recognition is improved.

It should be mentioned that according to foregoing character recognition method, a first characteristic value of a first character is calculated, and then the first characteristic value is compared with second characteristic values of the second characters in the corresponding character category of the first character in the database to obtain the second character having the closest characteristic value and use this second character as the recognized character of the first character.

Figure 4:
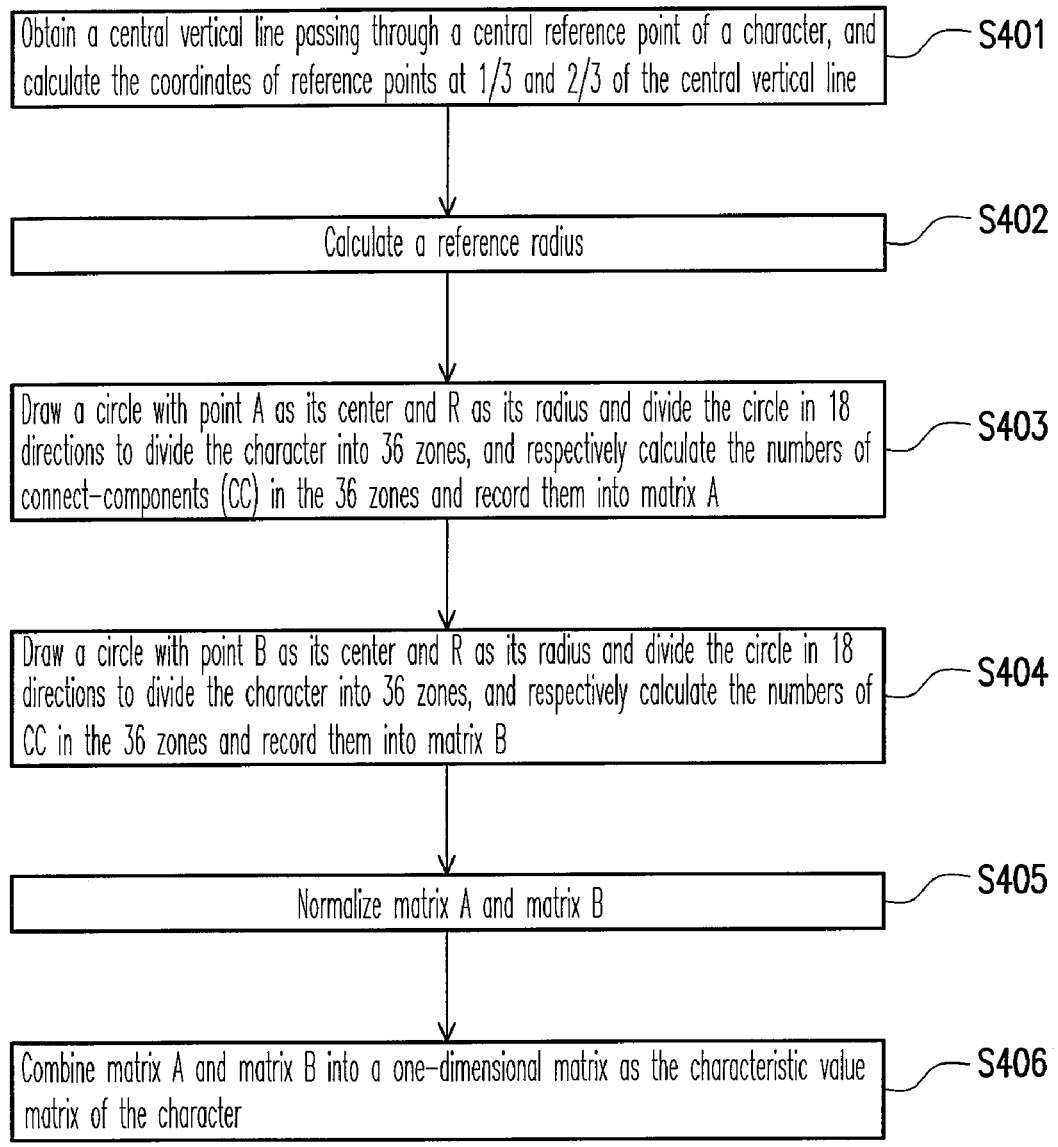
FIG. 4 is a flowchart illustrating a method for calculating a characteristic value according to an embodiment of the present invention.
Figure 5:
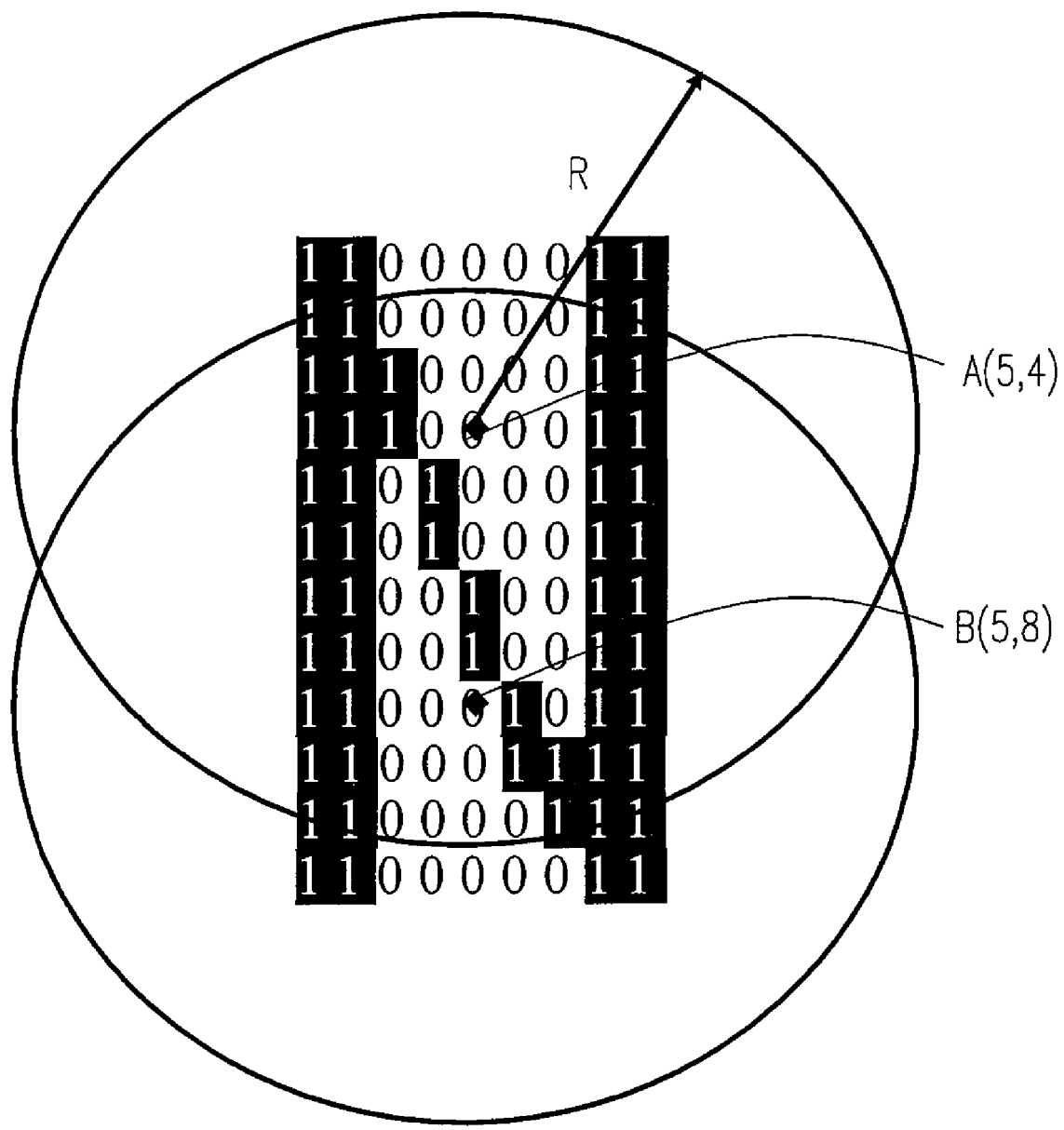
FIG. 5 illustrates an example of the calculation of a characteristic value according to an embodiment of the present invention.

FIG. 4 is a flowchart illustrating a method for calculating a characteristic value according to an embodiment of the present invention, and FIG. 5 illustrates an example of the calculation of a characteristic value according to an embodiment of the present invention. Referring to FIG. 4, in the present embodiment, a character (or a CC group) is divided into a plurality of equal parts, and the number of CCs contained by each of the equal parts is calculated to obtain a characteristic value matrix representing the character.

First, a central vertical line passing through a central reference point of the character is located, and coordinates of reference points at ⅓ and ⅔ of the central vertical line (points A and B in FIG. 5) are calculated (step S401). Next, a reference radius is obtained (step S402), and the reference radius R may be half of the diagonal of the character, i.e.

$$R = \sqrt{(\text{length of character})^2 + (\text{width of character})^2} \Big/ 2.$$

Here if a circle is drawn with point A as its center and R as its radius and divided in 18 directions, the character is then divided into 36 zones by the 18 directions and the circumference of the circle. Next, the numbers of CCs in these 36 zones are respectively calculated and recorded in a matrix A (step S403). Similarly, the character is also divided into 36 zones if a circle is drawn with point B as its center and R as its radius and divided in 18 directions. Accordingly, the numbers of CCs in the 36 zones are respectively calculated and stored in a matrix B (step S404).

Thereafter, these two matrixes are respectively normalized (step S405), namely, each element in the two matrixes is respectively divided by the sum of all the elements in that matrix in order to eliminate the effect of different character types or sizes. Eventually, the two matrixes are combined into a one-dimensional matrix as the characteristic value matrix of the character (step S406).

For example, the coordinates of points A and B of the character "N" in FIG. 5 are respectively (5, 4) and (5, 8), and the reference radius thereof is R=7.5. Thus, if a circle is drawn with (5,4) as its center and 7.5 as its radius and divided in 18 directions for respectively calculating the numbers of CCs in the divided zones, following matrix A is obtained:

A[2][18]=436432732541000132
000404000000000000

The first row of the matrix A shows the numbers of CCs in the 18 zones within the circle, and the second row of the matrix A shows the number of CCs in the 18 zones outside of the circle. Similarly, if a circle is drawn with (5,8) as its center and 7.5 as its radius and divided in 18 directions for respectively calculating the numbers of CCs in the divided zones, following matrix B is obtained:

B[2][18]=436100332436511362
000000000000202000

The first row of the matrix B shows the numbers of CCs in the 18 zones within the circle, and the second row of the matrix B shows the number of CCs in the 18 zones outside of the circle. Eventually, the two matrixes A and B are normalized and combined into a one-dimensional matrix and which is used as the characteristic value matrix of the character "N".

Besides the method described above, the present invention further provides a method for recognizing the first characters by using the corresponding prediction models of the first characters. However, foregoing methods for comparing characters are only described herein demonstratively, and those skilled in the art may also adopt other character comparison methods according to the actual requirement.

According to foregoing description, the present invention is focused on the method for determining the character category of a character according to the relative position of the character in the typographical lines. According to the present invention, all the characters in a database are categorized into small characters and non-small characters, and a method for determining the character category of a character is respectively provided for these two types of characters, which will be described herein.

Figure 6:
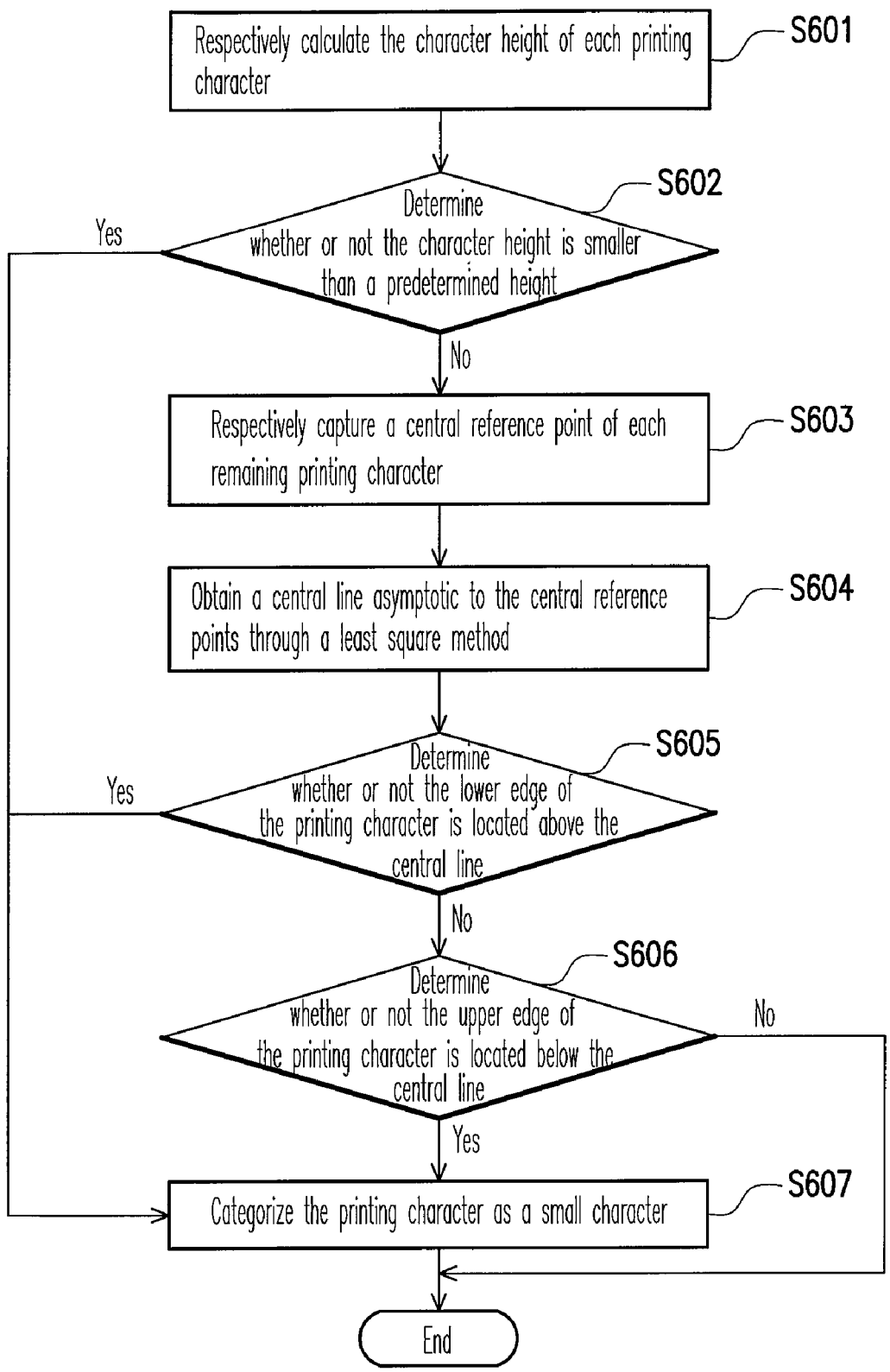
FIG. 6 is a flowchart illustrating a method for determining a small character according to an embodiment of the present invention.

First, whether a character is a small character or not is determined. Referring to FIG. 6, in the present embodiment, a line of printing words is scanned and those smaller or outlying characters are categorized as small characters.

First, each character in the scanned image is marked with a frame, wherein the frame includes the upper, lower, left, and right edge of the character. Then the character height of each typographical character is calculated according to the frame of the character (step S601).

After that, the character heights of these characters are compared with a predetermined height, and whether or not the character height of each character is smaller than the predetermined height is determined (step S602). The predetermined height may be half of the average character height of all the typographical characters; however, the scope of the predetermined height is not limited by the present invention.

If the character height of a character is smaller than the predetermined height, the character is categorized as a small character (step S607). After eliminating those characters having smaller character heights, a central reference point of each of the remaining characters is respectively captured, and a central line asymptotic to these central reference points is obtained through the least square method (step S604), so that the sum of the distances between the central reference points of the characters and the central line has a minimum value.

Whether there is still small character in the remaining characters is determined after the central line is defined. For example, whether the lower edge of a character is located above the central line is determined (step S605). If so, the character is categorized as a small character (step S607); otherwise, whether the upper edge of the character is located below the central line is determined (step S606). If so, the character is categorized as a small character (step S607). In short, in the present embodiment, those characters which do not pass through the central line are located, and these characters may be noises or punctuations which are smaller than actual English characters and are generally not printed on the central line.

Figure 7A:
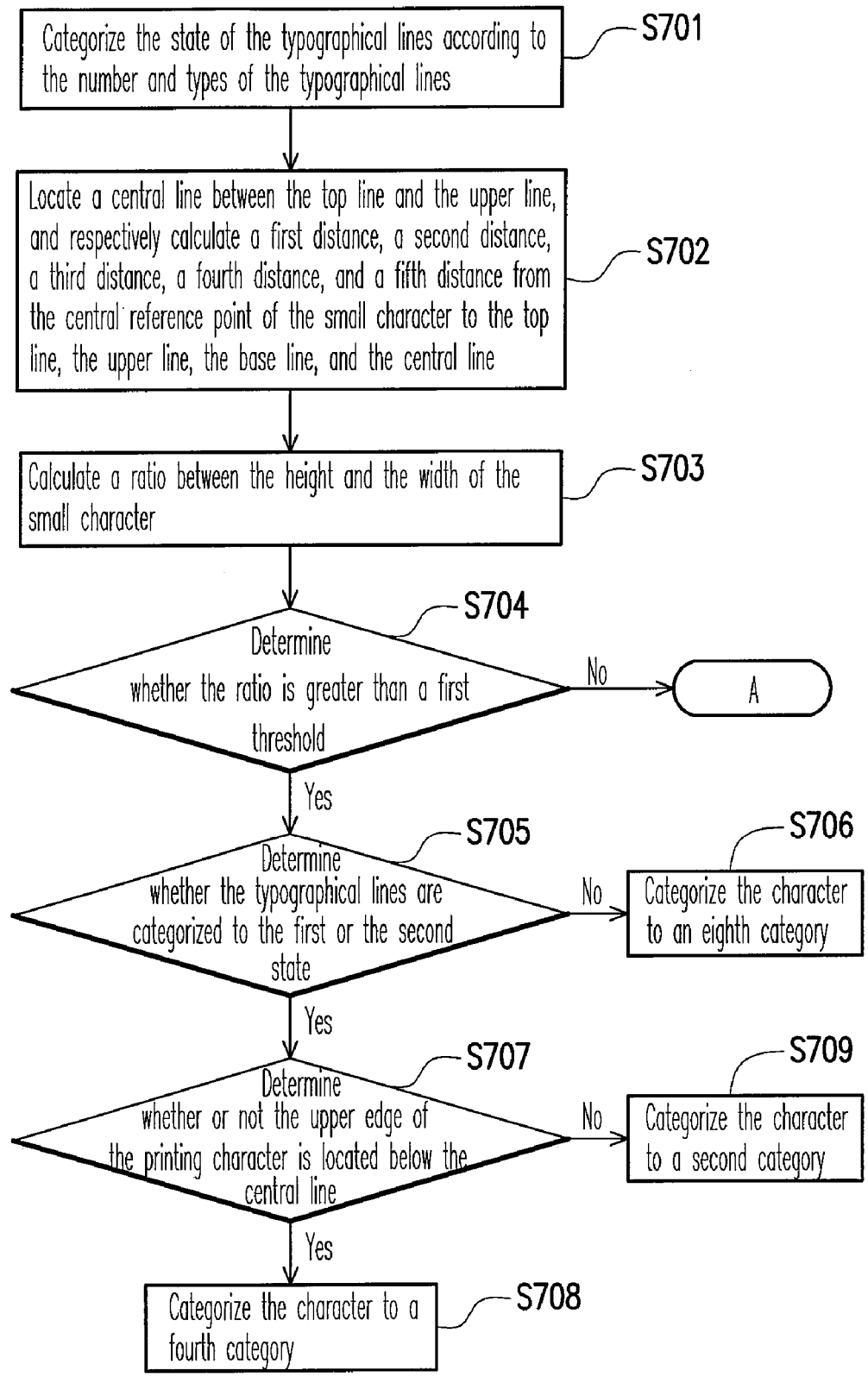
FIGS. 7A~7B is a flowchart illustrating a method for categorizing small characters according to an embodiment of the present invention.
Figure 7B:
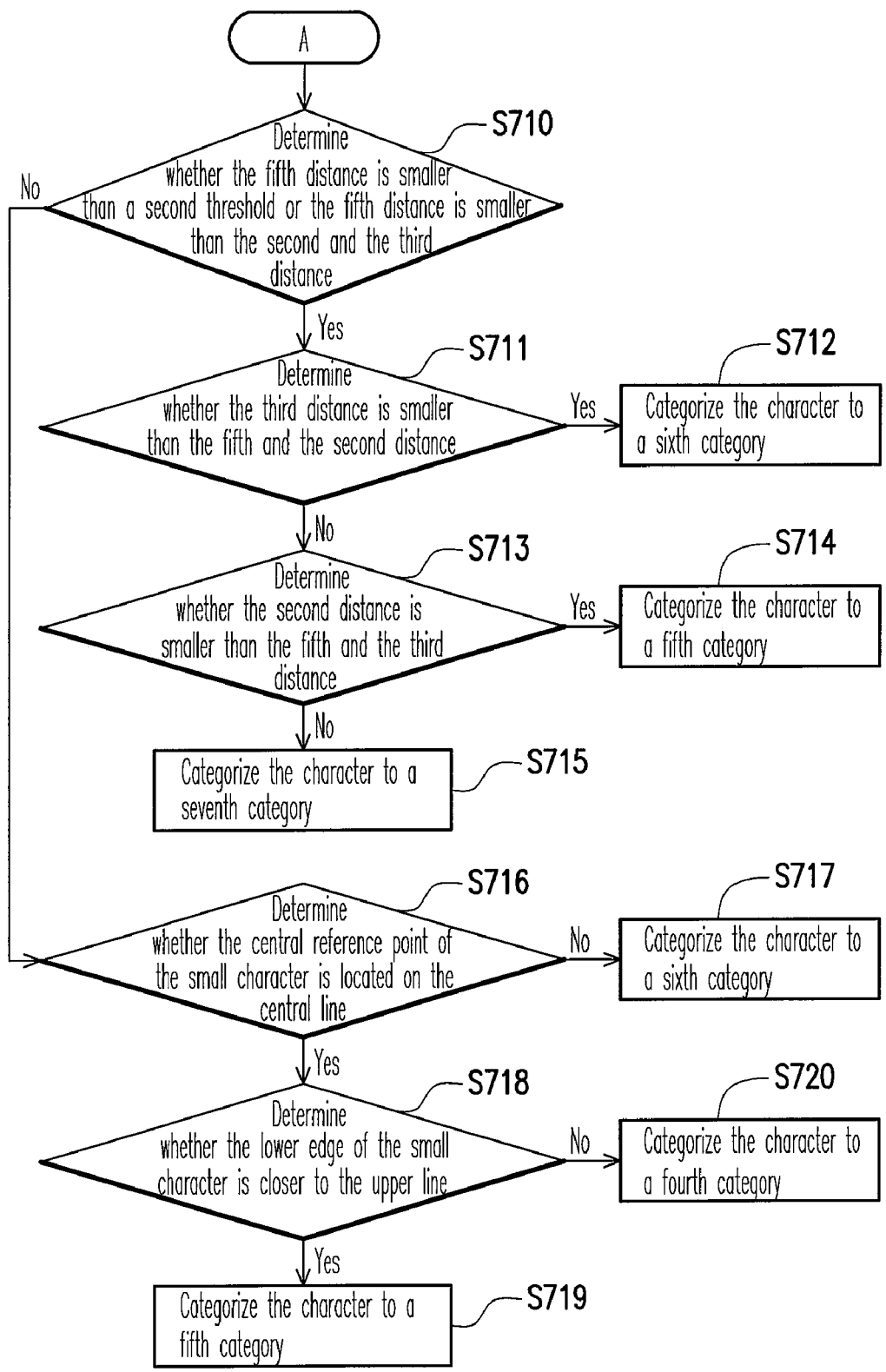

As described above, those small characters among the characters are located, and then these small characters are categorized. FIGS. 7A~7B are flowcharts illustrating a method for categorizing small characters according to an embodiment of the present invention. First, referring to FIG. 7A, in the present embodiment, the typographical lines are categorized to one of a plurality of states according to the number and types thereof (step S701), and a small character is categorized according to the state of the typographical lines. The states may include a first state, a second state, a third state, and a fourth state. The first state denotes that the typographical lines include the foregoing top line, upper line, base line, and bottom line. The second state denotes that the typographical lines include the foregoing base line, bottom line, and a typographical line combined by the top line and the upper line. The third state denotes that the typographical lines include the foregoing top line, upper line, and a typographical line combined by the base line and the bottom line. The fourth state denotes that the typographical lines include a typographical line combined by the top line and the upper line and a typographical line combined by the base line and the bottom line.

First, a central line between the top line and the upper line is located, and a first distance, a second distance, a third distance, a fourth distance, and a fifth distance from the central reference point of the small character to the top line, the upper line, the base line, the bottom line, and the central line are respectively calculated (step S702). In an embodiment of the present invention, the y intercept of the central line may be an average of the y intercepts of the top line and the upper line, and the slope thereof is equal to the slope of the upper line; however, the central line is not limited in the present invention, and any straight line between the top line and the upper line may be used as the central line according to the actual requirement.

Next, a ratio between the height and width of the small character is calculated (step S703), and the ratio is then compared with a first threshold in order to determine whether this ratio is greater than the first threshold (step S704), wherein the first threshold may be integer 4, but which is not limited thereto in the present invention.

In step S704, if the ratio of the small character is greater than the first threshold, whether or not the typographical lines are categorized as the first or the second state is further determined (step S705). If the typographical lines are not categorized as the first and the second state, the small character is categorized to an eighth category (step S706); otherwise, the distances from the lower edge of the small character to the top line and the upper line are calculated, and whether the lower edge of the small character is closer to the upper line than to the top line is determined (step S707). If so, the small character is categorized to a fourth category (step S708); otherwise the small character is categorized to a second category (step S709).

On the other hand, referring to FIG. 7B again, in step S704, if the ratio of the small character is not greater than the first threshold, whether or not the fifth distance is smaller than a second threshold or smaller than the second distance and the third distance is further determined (step S710). If one of foregoing conditions is met, whether the third distance is smaller than the fifth distance and the second distance is further determined (step S711). If so, the small character is categorized to a sixth category (step S712); otherwise, whether the second distance is smaller than the fifth distance and the third distance is further determined (step S713). If so, the small character is categorized to a fifth category (step S714); otherwise the small character is categorized to a seventh category (step S715).

Moreover, if neither of the conditions in step S710 is met, whether the central reference point of the small character is located on the central line is determined (step S716). If the central reference point of the small character is not located on the central line, the small character is categorized to the sixth category (step S717); otherwise, the distances from the lower edge of the small character to the upper line and the base line are respectively calculated, and whether the lower edge of the small character is closer to the upper line than to the base line is determined (step S718). If so, the small character is categorized to the fifth category (step S719); otherwise the small character is categorized to the fourth category (step S720).

According to the small character categorization method described above, the first to the eighth category may be as illustrated in FIG. 3; however, which are not limited thereto. The categorizations illustrated in FIG. 3 are also applied to the categorization of non-small characters, which will be described in detail below.

Figure 8:
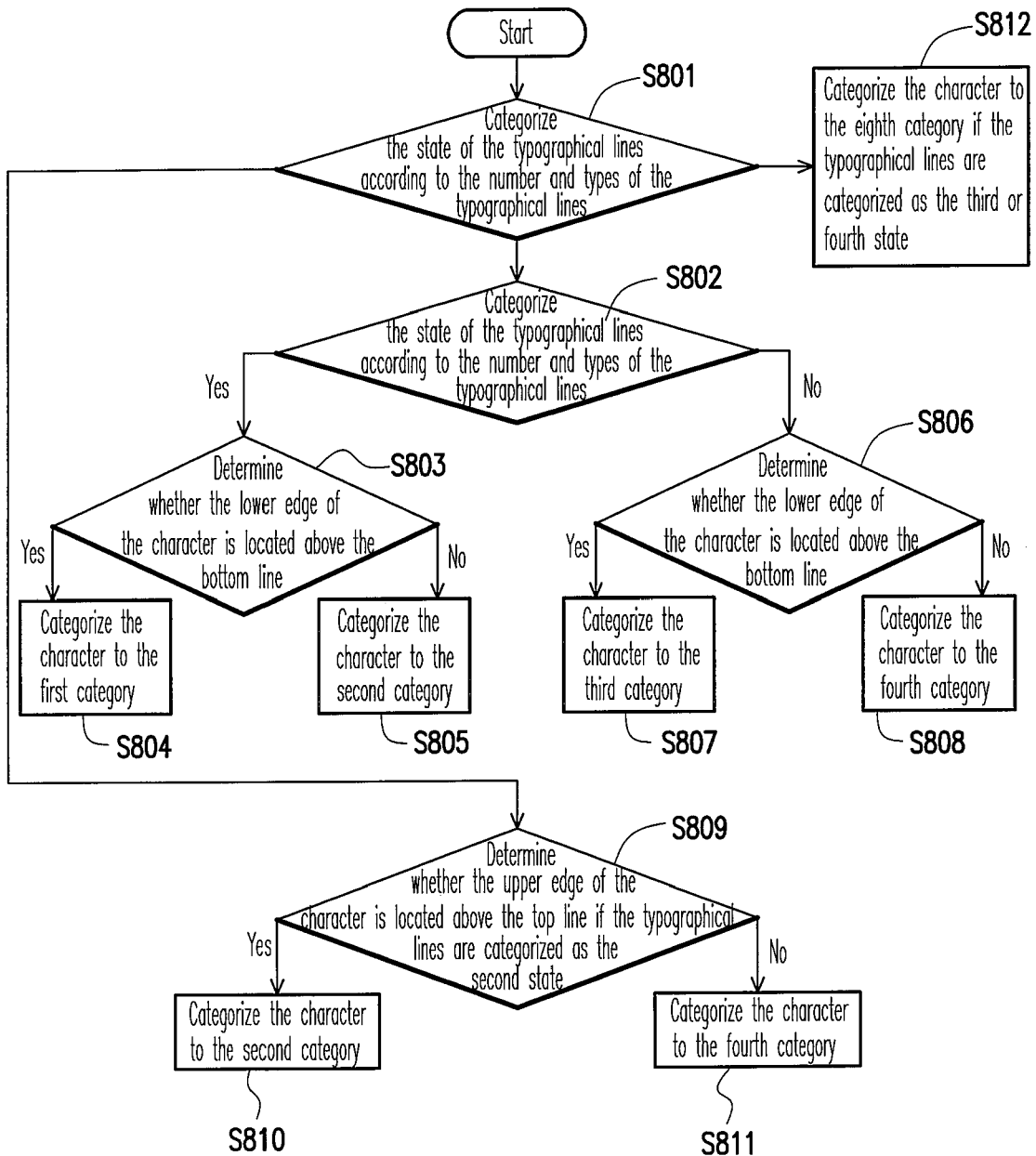
FIG. 8 is a flowchart illustrating a method for categorizing non-small characters according to an embodiment of the present invention.

FIG. 8 is a flowchart illustrating a method for categorizing non-small characters according to an embodiment of the present invention. Referring to FIG. 8, as described in foregoing embodiment, in the present embodiment, the state of the typographical lines is determined according to the number and types of the typographical lines (step S801), and a non-small character is categorized according to the state of the typographical lines. The states may include a first state, a second state, a third state, and a fourth state, and the definitions thereof are the same as described in foregoing embodiment, therefore will not be described herein.

If the typographical lines are categorized as the first state, whether the upper edge of the character is located above the top line is determined (step S802). If so, whether the lower edge of the character is located above the bottom line is further determined (step S803). If so, the character is categorized to a first category (step S804); otherwise the character is categorized to a second category (step S805).

In step S802, if the upper edge of the character is not located above the top line, whether the lower edge of the character is located above the bottom line is further determined (step S806). If so, the character is categorized to a third category (step S807); otherwise the character is categorized to a fourth category (step S808).

On the other hand, if the typographical lines are categorized as the second state, whether the upper edge of the character is located above the top line is determined (step S809). If so, the character is categorized to the second category (step S810); otherwise the character is categorized to the fourth category (step S811).

Finally, if the typographical lines are categorized as the third or the fourth state, the first character is categorized to an eighth category (step S812), namely, the first character cannot be categorized according to the state of the typographical lines.

Similarly, the first to the eighth category in the non-small character categorization method described above are also as illustrated in FIG. 3; however, which are not limited thereto. Foregoing methods for categorizing small and non-small characters can be used for recognizing all types of characters and the accuracy and speed of the character recognition can be both improved.

In summary, the character recognition method provided by the present invention has at least following advantages:

1. All the characters to be recognized are categorized according to the relative positions thereof in the typographical lines before these characters are recognized to respectively generate optical character recognition (OCR) data such as characteristic values of the characters.

2. The corresponding category of each character is determined according to the relative position of the character to the typographical lines, and the character is recognized with the OCR data corresponding to the category, thus, the speed for recognizing the character is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A character recognition method, comprising: using an optical character recognition device for
   a. obtaining a image with printing words;
   b. scanning a line of the printing words, wherein the line of printing words comprises a plurality of first characters;
   c. generating a plurality of typographical lines by using the first characters;
   d. determining a character category of each first character according to a relative position of the first character in the typographical lines, the step d. further comprising:
      d1. determining whether or not each first character is a small character, the step d1. further comprising:
         d1-1. calculating a character height of each first character; and
         d1-2. comparing the character height of each first character with a predetermined height, and categorizing the first character as a small character if the character height of the first character is smaller than the predetermined height;
      d2. performing a small character categorization if the first character is a small character; and
      d3. performing a non-small character categorization if the first character is not a small character; and
   e. comparing each first character with a plurality of second characters in a database belonging to the corresponding character category of the first character to obtain the second character corresponding to the first character and accordingly to recognize the first character, wherein the database records a plurality of character categories and the second characters in each of the character categories.

2. The character recognition method according to claim 1, wherein the typographical lines comprise a top line, an upper line, a base line, and a bottom line, the area between the top line and the upper line is an upper zone, the area between the upper line and the base line is a central zone, and the area between the base line and the bottom line is a downer zone.

3. The character recognition method according to claim 2, wherein step d. further comprises:
   categorizing the typographical lines into one of a plurality of states according to the number and types of the typographical lines.

4. The character recognition method according to claim 3, wherein the states comprise:
   a first state, denoting that the typographical lines comprise the top line, the upper line, the base line, and the bottom line;
   a second state, denoting that the typographical lines comprise the base line, the bottom line, and the typographical line represented by the top line and the upper line;
   a third state, denoting that the typographical lines comprise the top line, the upper line, and the typographical line represented by the base line and the bottom line; and
   a fourth state, denoting that the typographical lines comprise the typographical line represented by the top line and the upper line and the typographical line represented by the base line and the bottom line.

5. The character recognition method according to claim 4, wherein the categorization of each small character comprises:
   d2-1. locating a central line between the top line and the upper line, and calculating a first distance, a second distance, a third distance, a fourth distance, and a fifth distance from a central reference point of the small character to the top line, the upper line, the base line, the bottom line, and the central line, respectively;
   d2-2. calculating a ratio between a height and a width of the small character;
   d2-3. determining whether or not the ratio is greater than a first threshold;
   d2-4. determining whether or not the typographical lines are categorized to the first state or the second state if the ratio is greater than the first threshold;
      d2-4-1. calculating distances from the lower edge of the small character to the top line and the upper line and determining whether or not the lower edge of the small character is closer to the upper line than to the top line if the typographical lines are categorized to the first state or the second state;
         d2-4-1-1. categorizing the small character to a fourth category if the lower edge of the small character is closer to the upper line than to the top line;
         d2-4-1-2. categorizing the small character to a second category if the lower edge of the small character is not closer to the upper line than to the top line;
      d2-4-2. categorizing the small character to an eighth category if the typographical lines are not categorized to the first state and the second state;
   d2-5. determining whether or not the fifth distance is smaller than a second threshold or whether or not the fifth distance is smaller than the second distance and the third distance if the ratio is not greater than the first threshold;
      d2-5-1. determining whether or not the third distance is smaller than the fifth distance and the second distance if the fifth distance is smaller than a second threshold or the fifth distance is smaller than the second distance and the third distance;

d2-5-1-1. categorizing the small character to a sixth category if the third distance is smaller than the fifth distance and the second distance;

d2-5-1-2. determining whether or not the second distance is smaller than the fifth distance and the third distance if the third distance is not smaller than the fifth distance or the second distance;

d2-5-1-2-1. categorizing the small character to a fifth category if the second distance is smaller than the fifth distance and the third distance;

d2-5-1-2-2. categorizing the small character to a seventh category if the second distance is not smaller than the fifth distance or the third distance;

d2-5-2. determining whether or not the central reference point is located on the central line if the fifth distance is not smaller than a second threshold and the fifth distance is not smaller than the second distance or the third distance;

d2-5-2-1. calculating distances from the lower edge of the small character to the upper line and the base line and determining whether or not the lower edge of the small character is closer to the upper line than to the base line if the central reference point is located on the central line;

d2-5-2-1-1. categorizing the small character to the fifth category if the lower edge of the small character is closer to the upper line than to the base line;

d2-5-2-1-2. categorizing the small character to the fourth category if the lower edge of the small character is not closer to the upper line than to the base line; and d2-5-2-2. categorizing the small character to the sixth category if the central reference point is not located on the central line.

6. The character recognition method according to claim 5, wherein the categorization of the non-small character comprises:

d3-1. determining whether or not the upper edge of the first character is located above the top line if the typographical lines are categorized to the first state;

d3-1-1. determining whether or not the lower edge of the first character is located above the bottom line if the upper edge of the first character is located above the top line;

d3-1-1-1. categorizing the first character to a first category if the lower edge of the first character is located above the bottom line;

d3-1-1-2. categorizing the first character to a second category if the lower edge of the first character is not located above the bottom line;

d3-1-2. determining whether or not the lower edge of the first character is located above the bottom line if the upper edge of the first character is not located above the top line;

d3-1-2-1. categorizing the first character to a third category if the lower edge of the first character is located above the bottom line; and d3-1-2-2. categorizing the first character to the fourth category if the lower edge of the first character is not located above the bottom line.

7. The character recognition method according to claim 6, wherein the categorization of the non-small character further comprises:

d3-2. determining whether or not the upper edge of the first character is located above the top line if the typographical lines are categorized to the second state;

d3-2-1. categorizing the first character to the second category if the upper edge of the first character is located above the top line; and d3-2-2. categorizing the first character to the fourth category if the upper edge of the first character is not located above the top line.

8. The character recognition method according to claim 7, wherein the categorization of the non-small character further comprises:

d3-3. categorizing the first character to the eighth category if the typographical lines are categorized to the third state or the fourth state.

9. The character recognition method according to claim 8, wherein the character categories comprise:

the first category taking the upper zone, the central zone, and the downer zone;

the second category taking the upper zone and the central zone;

the third category taking the downer zone;

the fourth category taking the central zone;

the fifth category being the small character, the fifth category being located around the central line;

the sixth category taking the area between the central line and the upper line;

the seventh category taking the area between the central line and the base line; and the eighth category comprising the remaining characters cannot be categorized according to the typographical lines.

10. The character recognition method according to claim 1, wherein after step d1-2, the character recognition method further comprises:

d1-3. respectively capturing a central reference point of each of the remaining first characters;

d1-4. obtaining a central line asymptotic to the central reference points through a least square method;

d1-5. determining whether or not a lower edge of each first character is located above the central line, and categorizing the first character as a small character if the lower edge of the first character is located above the central line; and d1-6. determining whether or not an upper edge of each first character is located below the central line, and categorizing the first character as a small character if the upper edge of the first character is located below the central line.

11. The character recognition method according to claim 1, wherein the optical character recognition device is a scanner.

* * * * *